March 5, 1957
H. T. HUNTER ET AL
2,783,867
GLAZING APPARATUS
Filed Feb. 12, 1952
4 Sheets-Sheet 4
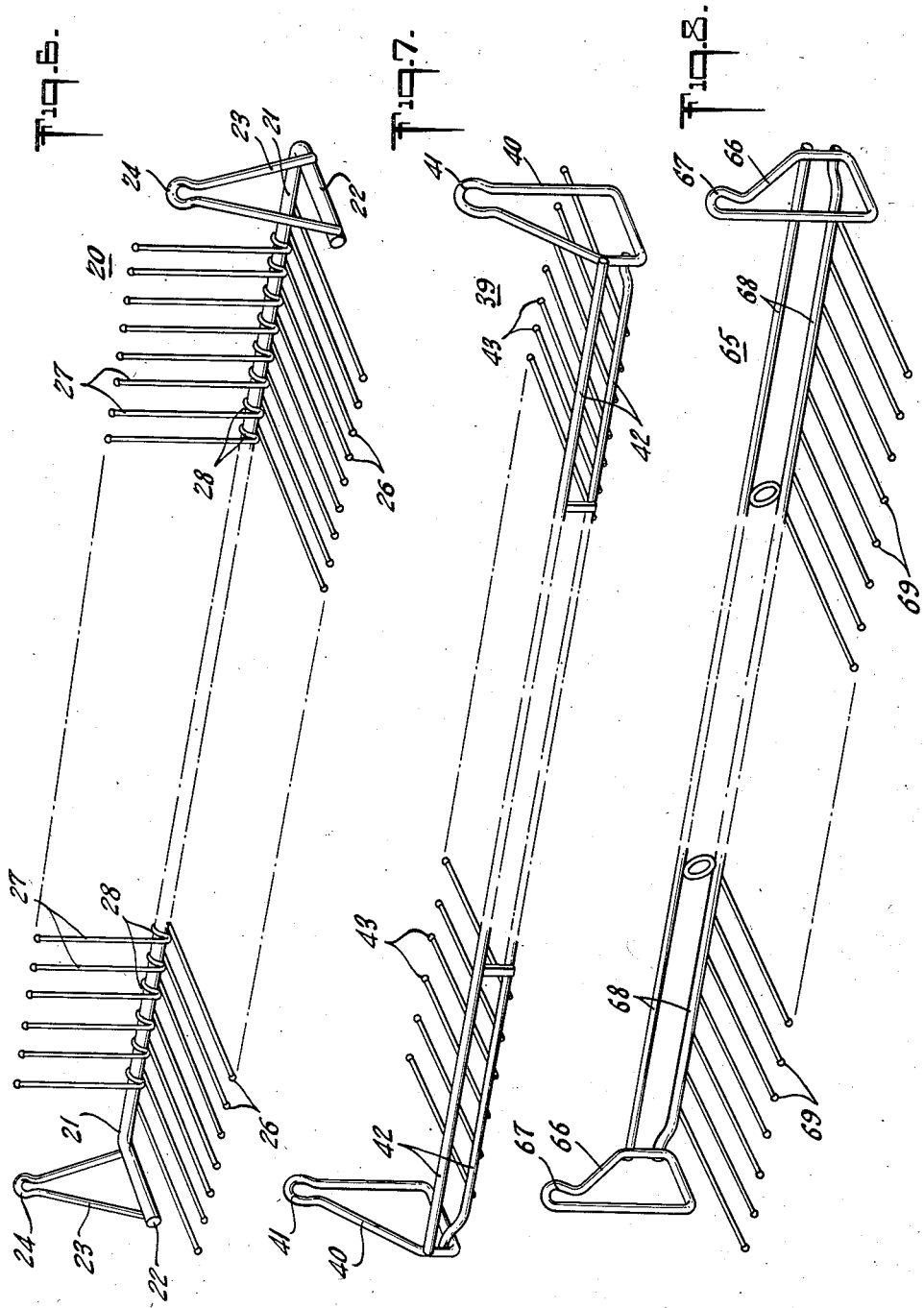
INVENTORS
HERBERT T. HUNTER
BEN W. WILSON
BY
William R. Liberman
ATTORNEY United States Patent Office 2,783,867
Patented Mar. 5, 1957

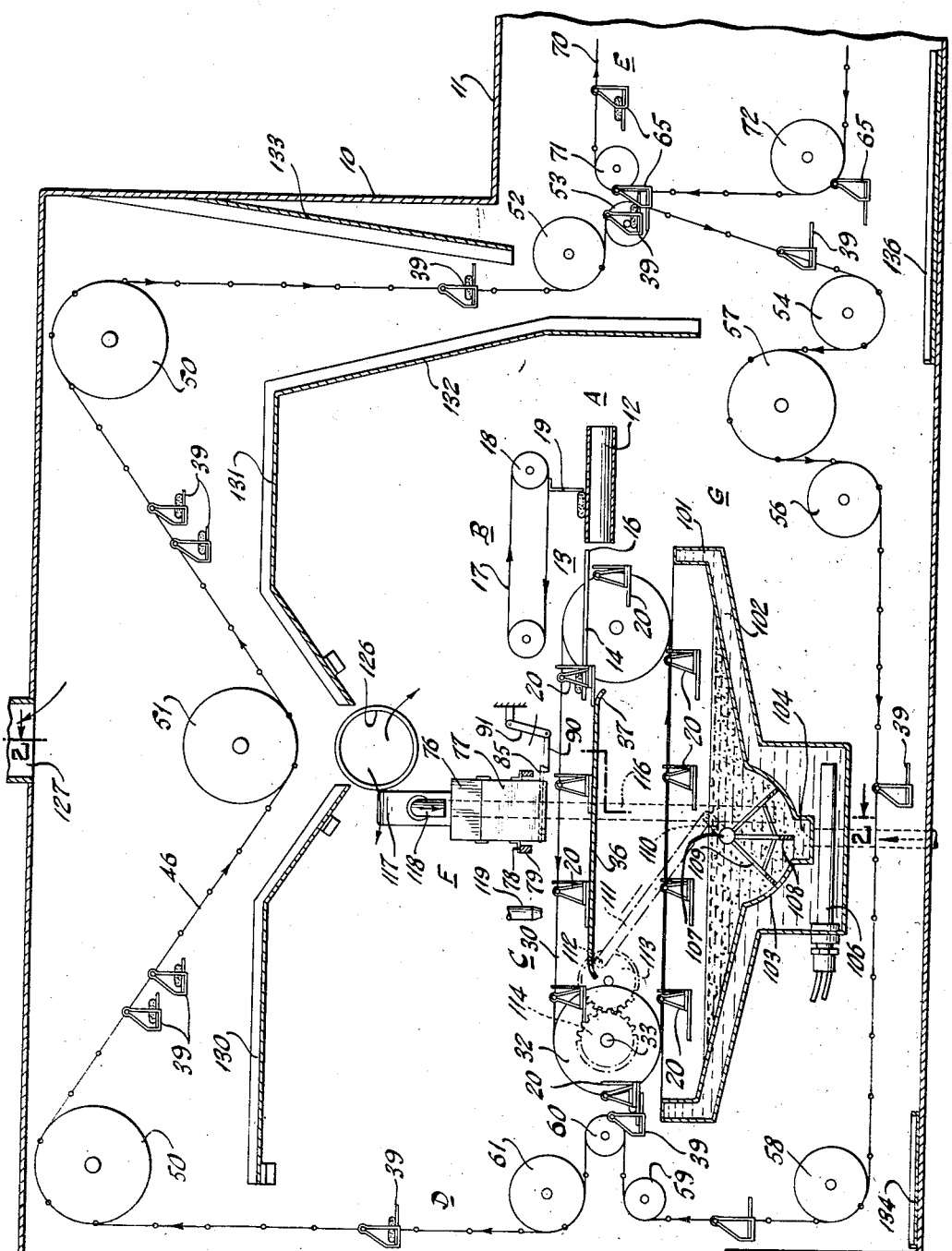

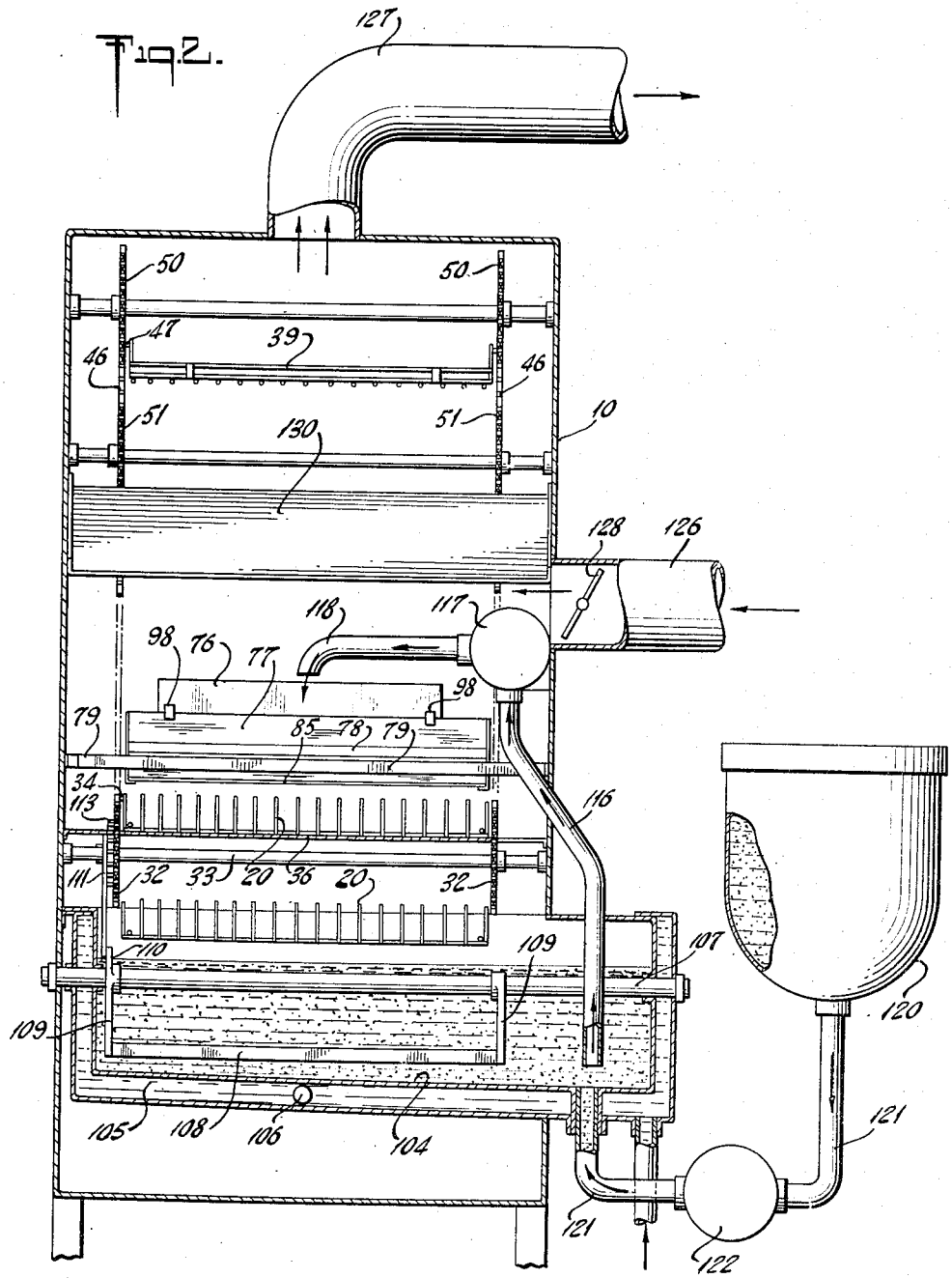

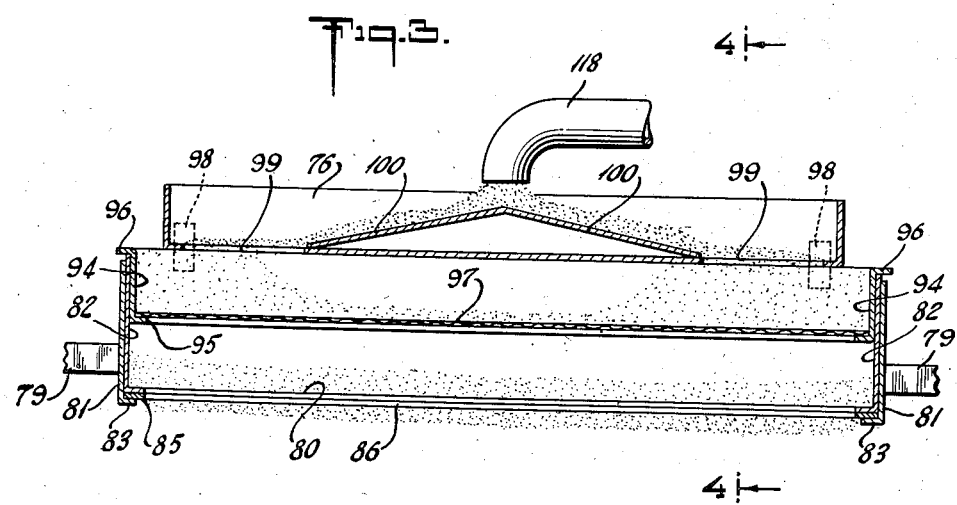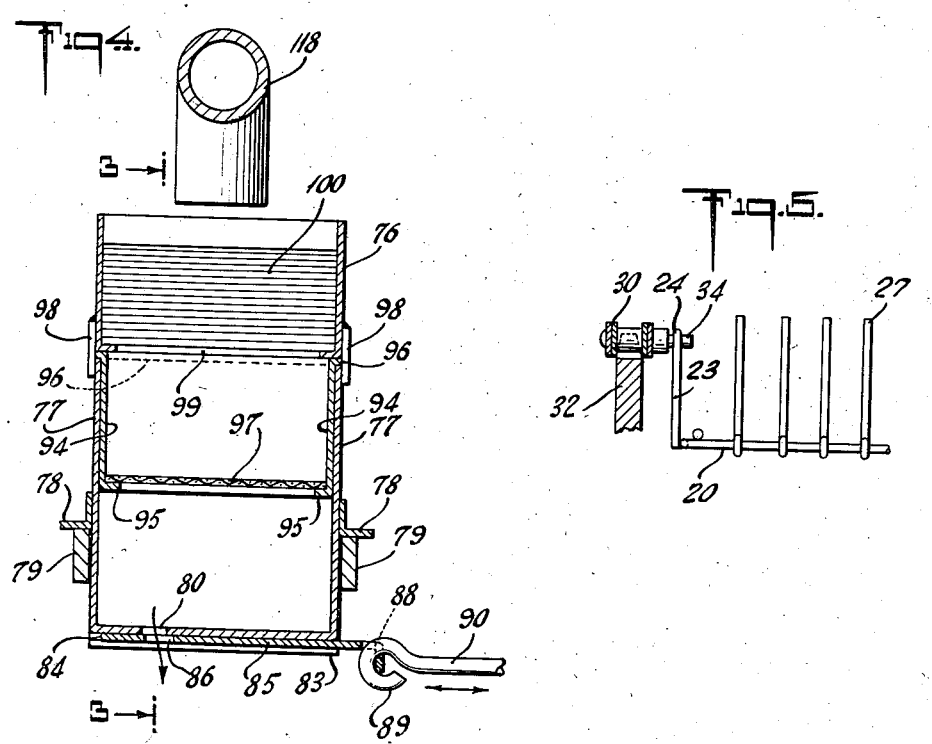

2,783,867

GLAZING APPARATUS

Herbert T. Hunter, Catonsville, Md., and Ben W. Wilson, Manhasset, N. Y., assignors to Doughnut Corporation of America, New York, N. Y., a corporation of New York Application February 12, 1952, Serial No. 271,208

3 Claims. (Cl. 198—102)

The present invention relates to an improved apparatus for the handling and treating of cakes, pastries, cookies, or the like, and it relates more particularly to an improved apparatus for the handling and application of a glaze or other coating to baked, fried or cooked articles, such as doughnuts or the like, in a steady, uninterrupted fashion.

In the coating of comestibles, particularly in the glaze coating of doughnuts and other fried cakes, the glaze in a viscous fluid state is applied to the surface of the cake and is then permitted to set. The glaze is conventionally applied to the doughnut or cake either manually, by brush, or by means of simple, partially automatic glazing equipment. This glazing equipment usually consists of an endless belt type conveyor which transports the cakes either through a pool of the liquid glaze or beneath a flowing sheet or fountain of the liquid glaze, and, thereafter, usually through an airblast which removes the excess glaze. The mechanisms heretofore proposed and employed in the glazing of doughnuts possess numerous drawbacks. They are generally of a semi-automatic nature, requiring some manipulation and the continuous presence of an operator or attendant who has to at least feed and remove the doughnuts to and from the glazing equipment. This is a serious drawback, particularly since the modern, large scale production of cakes and doughnuts is accomplished in a continuous manner and any step in the process which introduces a manual operation or which is not fully automatic and continuous, leads to inefficiencies and non-uniformity of product as well as to increases in production costs.

Furthermore, it has been found that a superior coating of the glaze, characterized by increased adhesion to a fried cake, is achieved by applying the glaze to a warm, freshly fried cake, and maintaining the glazed cake at an elevated temperature for a minimum period of time before allowing it to cool. The doughnut and cake glazing equipments heretofore used, receive the doughnuts, apply the glaze thereto, and immediately thereafter discharge the doughnuts to an atmosphere which permits them to cool rapidly. This results in an inferior glaze with poor adhesion properties, which, after a short time, is subject to flaking or is apt to become soggy.

It is, therefore, a principal object of the present invention to provide an improved apparatus for handling and treating bakery products and the like.

Another object of the present invention is to provide an improved apparatus for the handling, conveying and transferring of bakery products, such as doughnuts, cakes and cookies.

A further object of the present invention is to provide an improved apparatus for the handling and glazing of doughnuts, which apparatus is continuous and completely automatic, requiring no personal attendance, and is characterized by its efficiency, ruggedness and simplicity.

Still a further object of the present invention is to provide an improved, continuous doughnut glazing machine which produces a superior glaze having high adhesion properties.

The above and other objects of the present invention will become apparent from a reading of the following description, taken in conjunction with the accompanying drawings, wherein Figure 1 is a transverse sectional view, partially broken and partially diagrammatic, of a preferred embodiment of the present invention, as applied to the glazing of doughnuts;

Figure 2 is a sectional view taken along line 2—2 of Figure 1;

Figure 3 is a fragmentary transverse detail sectional view of the liquid glaze fountain, taken on the line 3—3 of Figure 4;

Figure 4 is a sectional view taken along line 4—4 of Figure 3;

Figure 5 is a detail fragmentary view, illustrating the mechanism for supporting the conveyor trays; and Figures 6, 7 and 8 are perspective views of the several doughnut transporting trays.

In one of its important aspects, the present invention broadly contemplates the provision of a chamber or cabinet having a feed and discharge opening, which chamber is provided with means for maintaining its interior at an elevated temperature; a conveying mechanism extending along a non-linear path between said feed and discharge openings; and means for depositing a coating material upon articles carried by said conveyor mechanism and the initial portion of their path of travel.

According to a preferred embodiment of the present invention, the articles to be glaze coated, doughnuts, for example, are carried in a single row by an endless belt type conveyor into the cabinet through the feed opening. A pusher element periodically traverses a transverse path across the upper face of the discharge end of the belt conveyor to move a row of the doughnuts onto an adjacent platform formed of cantilevered rods or fingers, the free ends projecting away from the belt conveyor. A set of regularly spaced suspended longitudinal wire trays are conveyed along a short closed path, having vertically spaced parallel horizontal runs and arcuate vertical end runs. These trays are defined by a series of parallel longitudinally spaced transverse horizontal fingers and are provided with rear walls defined by longitudinally spaced, upwardly extending fingers. The vertical fingers are so spaced that the path of the trays carry the vertical fingers into and along the spaces between the rods defining the platform, the horizontal section travelling below the platform. Thus, the rows of doughnuts deposited upon the platform are engaged by the vertical fingers and carried into successive corresponding trays.

Directly over the upper path of the trays are successively, a glaze fountain and an air jet, which extend the length of the trays. The path of the trays are short and the rate of advance rapid, so that the trays quickly carry the doughnuts past the fountain and air jet. A second set of regularly spaced suspended trays similar to the first trays, but lacking the upright fingers and having horizontal fingers which are spaced in staggered relationship relative to the horizontal fingers of the first set of trays, is transported along a closed path starting at a point intersecting the vertical end run of the first trays, going generally upwardly along a side wall of the cabinet, thence along the upper part of the cabinet, down the opposite side wall, along the bottom of the cabinet, and back to the starting point. The spacing between the successive second trays, and the rate of advance is less than the spacing and rate of advance of the first trays. Both trays are so spaced that successive trays of each set arrive at the point of intersection simultaneously, whereby the doughnuts carried by the first trays are transferred to the second tray, the fingers of each tray passing between the fingers of the other tray. A third set of trays, similar to the second trays, is provided and transported along vertically spaced horizontal paths, having connecting vertical end runs and extending through a cooling tunnel. The feed end runs of the third trays intersect the vertical end run of the second trays, the corresponding fingers intermeshing at the intersection to transfer the doughnuts from the downwardly travelling second trays to the upwardly travelling third trays. A heated glazing trough is disposed at the bottom of the cabinet below the air jet and fountain, and connected to the fountain by way of a pump. The upper part of the cabinet is connected by way of clamp conduits to a source of warm air and to the atmosphere.

Reference is now made to the drawing which illustrate a preferred embodiment of the present invention, as employed in the glazing of doughnuts, wherein the improved apparatus is preferably located between and in substantially abutting relationship with an automatic continuous deep frier and a tunnel type cooler. The transport and glazing mechanism is housed in a suitable cabinet 10 communicating with a continuous deep frier and with a tunnel cooler 11. The transport mechanism includes a feed conveyor A, a transfer mechanism B, a glazing conveyor C, a post heat conveyor D, and a cooling conveyor E. The conveyors A and C—E, and the transfer mechanism B, are driven in synchronism, preferably by a common drive device and at predetermined speeds, as will be hereinafter described. While a tunnel type of cooler is referred to, cooler structures of other types, such as vertical may be used within the scope of the present invention.

The feed conveyor A is of the continuous belt type, supported between a pair of transversely spaced horizontal drums 12, at least one of which is positively driven. The conveyor extends from the deep fry unit and runs substantially the entire depth of the cabinet 10, at substantially its vertical mid-point, and at one end. The doughnuts are deposited upon the conveyor A at its feed end from the deep fry unit, in continuous rows, and at the same rate as the glazing apparatus is set to receive them as determined by the speed of the respective conveyors.

A transfer platform 13 extending substantially the depth of the cabinet 10 is suitably supported at the level of the upper run of the belt conveyor A, and consists of a plurality of cantilevered rods or fingers 14, mounted in a crosspiece 16, disposed adjacent the belt conveyor A. The cantilevered rods 14 project laterally and horizontally from the crosspiece 16 and are regularly transversely spaced. Immediately above the belt conveyor A and the platform 13, is a mechanism B for periodically transferring a group of doughnuts from the belt conveyor to the platform. This transfer mechanism includes a horizontal endless belt 17 supported between a pair of laterally spaced drums 18, at least one of which is positively driven in synchronism with the other conveyors. A sweep blade 19, extending the width of the platform 13, is mounted on the belt 17 and transported thereby, the lower edge of the sweep blade 19 reaching substantially to the surface of the conveyor belt A and platform 13, when in a depending position. The continuous belt 17 is rotated in a clockwise direction, as seen in Figure 1, periodically carrying the sweep blade 19 across the conveyor belt A and to a point short of the free end of the platform 13.

The glazing conveyor C includes a plurality of regularly spaced trays 20 transported in a laterally extending, closed path from a point below the trailing edge of the platform 13 to a point spaced inwardly from the opposite side of the cabinet 10, the path having upper and lower parallel horizontal runs connected by curved vertical end runs. Each of the trays 20, as may best be seen in Figure 6 of the drawings, is formed of wire and bent rod, and includes a longitudinally extending support rod 21, having its ends 22 laterally bent and parallel. A triangular wire bracket 23 is secured by welding, or the like, to each of the rod ends 22, and projects vertically upwardly. The upper ends of the brackets 23 are arcuately formed into open, pin engaging eye portions 24, to permit the swingable support of the trays 20. Supported in regularly spaced fashion along the length of the rod 21, are a plurality of bent wire elements consisting of parallel horizontally projecting cantilevered fingers 26, which define the base of the tray and upright fingers 27, which define the back of the tray. The fingers 26 and 27 are joined by the curved sections 28 which substantially encircle the rod 21, and are preferably welded thereto to form a rigid assembly.

The trays 20 are transported along their closed path by a pair of transversely spaced sprocket chains 30, which are supported adjacent the end walls of the cabinet 10, and driven by laterally spaced pairs of sprockets 32, which are mounted on horizontal shafts 33, at least one of which is positively driven. Each of the sprocket chains 30 is provided with regularly spaced inwardly projecting pins 34, which engage the corresponding eye portions 24 of the tray brackets 23, thereby supporting the trays 20 in a suspended position, the center of gravity of the loaded tray being directly below the center of the eye portion 24. The trays 20 are transported in a counter-clockwise direction, as seen in Figure 1 of the drawings. The path of the trays 20 and the spacing of the upright fingers 27 and the platform rods 14 are such that the vertically extending fingers 27 are carried through the spaces between the rods 14, and, thence, along the said space for substantially half the length thereof, and past the end of the platform 13. Furthermore, the movements of the sweep blade 19 and the trays 20 are so synchronized that a tray 20 passes in engagement with the platform 13 for each cycle of the sweep blade 19, the tray 20 following the sweep blade 19 and removing and receiving a row of doughnuts which the preceding cycle of the sweep blade 19 has transferred from the conveyor A to the top of platform 13. Immediately below the upper run of the trays 20 is a suitably supported laterally extending plate 36, having curved depending end lips 37, the principal purpose of the plate 36 being to stabilize the trays 20 when they are subjected to a violent rotating force accompanying the application of a glaze.

The post heat conveyor D likewise includes a plurality of trays 39 of somewhat similar construction to the glaze trays 20, but lacking the upright fingers 27, and a system for transporting the trays 39 along a tortuous path along substantially the top, bottom and side walls of the cabinet 10. Each of the trays 39 includes a pair of parallel transversely spaced upright wire brackets 40, of generally right triangle contour, terminating at their tops in arcuate pin engaging eye portions 41, and supporting between their lower side portions a pair of vertically spaced horizontal parallel wire rods 42, which define a low end wall and supporting framework. A plurality of regularly spaced horizontal parallel cantilevered fingers 43 project perpendicularly from and are suitably secured to the lower rod 42, and define the base of the tray 41. The spacing between the fingers 43 is the same as the spacing between the horizontal fingers 26 of trays 20, but are so positioned relative to the end brackets 40 as to be staggered relative to the fingers 26 of trays 20 and coincide with the spaces between said fingers 26.

The trays 39 are transported along their path through the post heat zone by a transversely spaced pair of sprocket chains 46, which are located adjacent the end walls of the cabinet 10, and are advanced and guided by a plurality of pairs of sprockets. The trays are supported in suspended position by pins 47, projecting inwardly from the sprocket chains 46, and engaging the corresponding eye portions 41 of the tray brackets 40. It should here be noted that, as viewed in Figure 1 of the drawings, the horizontal fingers 43 of the trays 39 project from left to right, whereas the horizontal fingers 26 of the trays 20 project from right to left.

The chain advancing and guiding sprockets include sets of sprockets in the upper portion of cabinet 10, a pair of sprockets 50 being located adjacent the upper corners of the cabinet 10, and a pair of sprockets 51 being located just below the level of sprockets 50, 50, and spaced well below the top of the cabinet 10 at about the mid-point thereof. Along the side wall of the cabinet 10 adjacent the cooling tunnel, are two sets of sprockets 52 and 53 respectively, the lower sprockets 53 being smaller than, and spaced diagonally to the right of and below sprockets 52, the two sets of sprockets defining the discharge end of the post heat conveyor D. At the lower right hand corner of the cabinet 10 are laterally spaced lower sets of sprockets 54 and 56, and an intermediate set of sprockets 57 at a higher level than the sprockets 54 and 56, and at the lower left hand corner of the cabinet is a pair of sprockets 58. Positioned at substantially the level of the glaze conveyor sprockets 32 are three pairs of sprockets 59, 60 and 61, respectively, which define the feed or pick-up end of the post heat conveyor system. The axis of the sprockets 60 is at the same level as the axis of the sprockets 32, and the distance between the peripheries of these sprockets is less than the sum of the lengths of the fingers 26 and 43 of trays 20 and 39 respectively. The sprockets 59 and 61 are closer to the end wall of the cabinet 10 than the sprocket 60, and are respectively below and above the level of the sprocket 60.

As viewed in Figure 1, the path of the sprocket chains 46 is clockwise along the lower left periphery of the sprocket 61, then upwardly and around the upper part of the sprockets 50, diagonally downwardly along the bottom of sprockets 51, diagonally upwardly along the top of the other sprocket 50, vertically downwardly and around the lower left of the sprocket 52, horizontally and around the upper right of sprocket 53, diagonally downwardly around the lower part of sprocket 54, the upper part of sprocket 57 and the lower right hand corner of sprocket 56, left along the bottom of the cabinet 10, around the lower left of the sprocket 58, upwardly and then around the upper left of the sprocket 59, horizontally and around the right hand portion of the sprocket 60, and thence horizontally to the sprocket 61. The sprockets 50 through 61 are suitably mounted on shafts and axles, some of which are positively driven. The spacing of the trays 39 along the sprocket chain 46 is less than the spacing of the trays 20 along the sprocket chain 30, and the ratio of the speed of the sprocket chain 46 to the speed of the sprocket chain 30 is the same as the ratio of the distance between successive trays 39 to the distance between successive trays 20. Furthermore, the sprocket chains 46 and 30 are so phased that the downwardly moving fingers 26 of a tray 20 intermesh with the upwardly moving fingers 43 of a tray 39 when the corresponding tray supporting pins cross the horizontal diameters of the sprockets 32 and 60 respectively, at which point the trays are traveling vertically, and the doughnuts carried by the tray 20 are thus transferred to the tray 39.

The cooler conveyor E includes a plurality of regularly spaced trays 65 transported along parallel horizontal runs connected by a vertical end run, the feed end of the cooler path intersecting the discharge end of the post heat path of the trays 39 at the sprocket 53. The trays 65 are of similar construction to the trays 39, having supporting end brackets 66 of generally right triangle outline terminating at their tops in arcuate pin engaging eye portions 67. Mounted between one of the arms of the brackets 66 are the longitudinal parallel rods 68, the lower one of which supports the horizontal regularly spaced cantilevered fingers 69, the spacing and locating of which corresponds to that of the fingers 26 of the trays 20. A pair of transversely spaced sprocket chains 70 traverse a path through the cooling tunnel and are advanced in a clockwise direction, the feed end travelling around vertically spaced pairs of sprockets 71 and 72, whose common left hand reach is in a vertical line. The sprocket 72 is adjacent the lower end of the cooling tunnel and the cabinet bottom, the upper sprocket 71 being substantially at the level of the sprocket 53 and horizontally spaced therefrom a distance slightly less than the sum of the lengths of the fingers 69 and 43 of trays 65 and 39 respectively. The speed of advance and spacing of the trays 65 are the same as those of trays 39, the successive trays intersecting each other substantially at, or slightly below, the level of the sprockets 53 and 71, the fingers 43 and 69 of the respective trays 39 and 65 moving in opposite directions intermeshing at the point of intersection. Thus, the doughnuts are transferred from the downwardly moving trays 39 to the upwardly moving trays 65 at the intersection, and are conveyed by the said trays 65 through the cooling tunnel 11. The trays 65 are supported on the sprocket chains 70 by means of pins projecting inwardly from the chains 70 and engaging the eye portions 67 of the tray brackets 66, just as trays 20 are supported by pins 34.

The glaze depositing mechanism, or fountain F, is supported above the upper run of the trays 20 substantially midway along said run and includes a pair of vertically stacked troughs 76 and 77, which extend for substantially the depth of the cabinet 10 within the runs of chains 30. The lower trough 77 is of rectangular cross-section and has secured along its lower side walls, angle members 78 which rest upon suitably supported cross bars 79. Formed in the bottom wall of the trough 77 is a longitudinal rectangular slit 80 (see Figure 4) which extends substantially the length of the trough 77. A plate member 81 is secured to each end wall 82 of the trough 77, and is provided at its lower end with an inwardly extending flange or lip 83, which is located below the bottom wall of the trough 77 to define a pair of parallel end grooves or tracks 84. Slideably engaged by the tracks 84, and abutting the bottom face of the trough 77, is a valve plate 85 having a longitudinal slit 86 formed therein of the same configuration as the slit 86. Extending rearwardly of the valve plate 85 is an apertured ear 88, which is engaged by an eye 89 formed at the end of a rod 90, which, in turn, is connected by a link and mechanism 91 which projects through the wall of the cabinet 10, and permits the adjustment of the plate 85 with respect to the bottom of trough 77, and, hence, the opening 80 in the bottom of the trough 77.

Nesting in the upper part of the trough 77 is the rectangular sleeve member 94, having an inwardly projecting peripheral lip 95 at the bottom thereof, and an outwardly projecting flange 96 which rests upon the upper edge of the trough 77. Supported by and mounted on the upper surface of lip 95 is a rectangular screen 97 which is supported substantially at the horizontal mid-plane of the trough 77.

The upper trough 76 is of the same width and of lesser length than the trough 77, and is stacked upon the trough 77 by means of two pairs of depending flat tabs 98 secured to the outer end faces of the side walls of the upper trough 76 and which abut and engage the corresponding side walls of the lower trough 77. The upper trough 76 defines a distributing trough and has formed in its bottom wall a pair of rectangular openings 99, which are located at the ends of the trough 76. A pair of inclined baffle plates 100 extend from the inner edges of the openings 99 and join along a horizontal line just below the upper edge of the trough 76 at the longitudinal mid-point thereof.

A liquid glaze receiving and agitating trough G is disposed immediately below the lower return run of the sprocket chain 30, and extends substantially the full depth of the lower section of the cabinet 10 and beyond both ends of the conveyor C. The trough G is provided with jacketed walls including vertical side walls 101 and inclined bottom walls 102, which extend to a transverse arcuate shaped well 103, the bottom of which is provided with a longitudinal rectangular recess 104 formed therein for receiving undesirable non-soluble sediment. The jacketed walls of the trough G are filled with oil 105, which is maintained at a predetermined elevated temperature by means of an electrical immersion heater 106 connected through a suitable thermostatic control likewise immersed in the oil, to a source of electric current.

The liquid glaze contained in the trough G is continuously maintained in a thoroughly mixed condition by means of an agitating mechanism, including a horizontal transverse shaft rotatably supported by the end walls of the trough G, coaxial with the arcuate walls of the well 103. A plurality of angularly spaced agitating and wiping blades 108 are supported along the length of the well 103, each of the blades 108 being supported at the end of a corresponding pair of transversely spaced radially extending arms 109 fixed to the shaft 107. The outer edges of the blades 108 abut the face of the arcuate walls of the well 103 and are angularly reciprocated by the rocking of the shaft 107.

A crank 110 is fixed to the shaft 107 and is pin connected to a link 111 which, in turn, engages a pin 112, eccentrically mounted on a rotatably supported gear 113. The gear 113 engages a corresponding gear 114 which is mounted on a common shaft with the sprocket 32 and is rotatable therewith. Thus, upon the operation of the conveyor C, and rotation of the sprocket 32, a rocking motion is imparted to the shaft 107 by way of the gear and link mechanism actuating the blades 108 to agitate the liquid glaze and direct any sediment into the recess 104. The liquid glaze is circulated from the trough G to the glaze fountain F by means of a conduit 116 immersed in the trough G and connected by way of a pump 117 to a conduit 118, having a depending portion whose open end is directed toward the junction line of the baffle plate 100 in the trough 76. The rate of the pump 117 may be varied by any suitable means, and the opening of the slit 80 in the trough 77 adjusted as aforesaid, to control the flow of the liquid glaze from the fountain upon the transported doughnuts.

Following the liquid glaze fountain and directed upon the upper run of the conveyor C, is an air nozzle 119 extending across the depth of cabinet 10. The blast of air from the nozzle 119 is directed against the freshly glazed doughnuts to remove the excess glaze and form a uniform coating. The liquid glaze which is not retained by the doughnuts flows back into the trough G, where it is admixed with the remaining glaze therein, and recirculated. Furthermore, should any foreign matter, dough, or doughnuts fall into the trough G, they will settle in the recess 104, or, if any should reach the conduit 116, it will be filtered out by the screen 97 in the trough 77.

A glaze preparing and mixing tank 120 is connected by way of conduits 121 and pump 122 to the bottom of the glaze trough G. Thus, when the liquid glaze in the apparatus must be replenished, the glaze is deposited or prepared in the tank 120, and the pump 122 operated until sufficient liquid glaze has been added to the trough G.

The temperature in the cabinet 10, particularly the upper portion thereof, is maintained at a predetermined elevated level, preferably in excess of 85° F. by means of a duct 126 connected to a source of warm air, for example, a doughnut deep frying unit, and entering through the wall of the cabinet 10 at a point just above the glaze fountain F. The exhaust air from the cabinet 10 passes through a duct 127, entering through the top of the cabinet. A butterfly valve or damper 128 is situated in the duct 126 to control the flow of warm air and is preferably automatically regulated by any well known mechanism in response to the temperature in the upper portion of the cabinet 10, to maintain said temperature at a predetermined level.

A series of baffles are positioned in the cabinet 10, whose principal purpose is to confine the warm air, and which also catch drippings from the transported doughnuts, thereby preventing interference with the glazing operation. The baffles are suitably supported, extend the full depth of the cabinet 10, and include the baffles 130 and 131 disposed below the upper run of the conveyor D, the baffle 130 extending horizontally from the left vertical run of the conveyor D, and then inclined downwardly to a point just short of the warm air inlet, and the baffle 131 extending horizontally from a point spaced from the downward vertical run of the conveyor D and then inclined downwardly to a corresponding point opposite to that of the baffle 130. The lower confronting edges of the baffles 130 and 131 are spaced to permit the upward flow of the air entering through the warm air inlet. Extending downwardly from the upper free edge of the baffle 131 is a sharply inclined baffle 132, joined to a vertical section which terminates at a point just above the sprocket 57. Another baffle 133 is inclined sharply downwardly from the upper right hand edge of the cabinet 133, to a point immediately above the sprocket 52. In order to facilitate the cleaning and maintenance of the cabinet 10, a drip pan 134 rests on the bottom of the cabinet 10 at the left hand edge below the sprocket 58, and a drip pan 136 rests on the cabinet bottom below the sprockets 54 and 72. Thus, any drippings from the doughnuts carried along the vertical runs of the conveyor D are caught and collected by the drip pans 134 and 136.

In operation, doughnuts are deposited on the feed conveyor A from the deep fry unit, in a continuous row, at the same rate as the glazing apparatus advances the doughnuts. The sweep blade 19 completes a full cycle for each advance of the conveyor A an amount substantially equal to the width of the trays 20, 39 and 65, and during each cycle pushes a row of doughnuts from the conveyor A to the delivery end of the platform 13. Following each advance of the sweep blade 19 is a successive tray 20, the vertical fingers 27 thereof extending upwardly between the platform rods 14 and pushing the row of doughnuts onto the respective tray, as the tray advances. The doughnuts are carried by the trays 20 rapidly through the descending sheet of liquid glaze falling from the glaze fountain F, and then under the blast of air emanating from the jet 119. A uniform coating of glaze is thus deposited upon the doughnuts which are then transferred to a tray 39 as the latter passes upwardly in intermeshing relationship with the downwardly travelling tray 20 at the line of intersection of their respective paths. The tray of doughnuts is then slowly transported upwardly and through the post heat section of the cabinet 10, and thence downwardly to the discharge end of its path where the doughnuts are transferred to an upwardly advancing tray 65 as it passes in intermeshing relationship with the descending tray 39 at the intersecting line of their paths, the loaded trays 65 thence advancing through the cooling tunnel 11, at the end of which the finished doughnuts are discharged. The excess liquid glaze extruded from the glaze fountain F and not adhering to the doughnuts falls into the trough G where it is intermixed with the liquid glaze therein, and recirculated, or otherwise collected.

While there has been described and illustrated a preferred embodiment of the present invention, it is obvious that numerous changes and alterations may be made without departing from the spirit thereof. The following is claimed:

1. An article handling apparatus comprising a first pair of transversely spaced parallel endless conveyors traversing a first end run having a vertical component passing through an article transfer zone, a first set of trays provided with article supporting bases each having a laterally extending, transverse medial axis and defined by a plurality of spaced parallel cantilevered first fingers said trays being suspended from and between said first conveyors and each being freely swingable about an axis disposed in the vertical plane of and parallel to said corresponding transverse axis, said first fingers facing a common direction, a second pair of transversely spaced parallel endless conveyors traversing a second end run provided with a vertical component passing through said article transfer zone, a second set of trays having article supporting bases each having a laterally extending, transverse medial axis and defined by a plurality of spaced parallel cantilevered second fingers, said second trays being suspended from and between said second conveyors and each being freely swingable about an axis disposed in the vertical plane of and parallel to said corresponding transverse axis and said second fingers facing a common direction opposite to that of said first fingers, and means synchronously driving said first and second conveyors whereby they traverse said first and second end runs in opposite directions, said first and second end runs being longitudinally spaced and said first and second fingers being staggered relative to each other whereby said first and second fingers pass between each other while said trays are carried by said conveyors through said transfer zone, wherein said first conveyors have a longitudinal run and a third end run having a vertical component and joining said longitudinal run, said third end run being longitudinally spaced from said first end run and said first trays are provided with backs defined by upwardly directed fingers mounted on said article supporting bases, said apparatus including a longitudinally extending platform defined by cantilevered fingers starting at a point rearwardly of said third end run and extending in the direction of said longitudinal run and being staggered relative to said tray back fingers, said first trays being transported by said first conveyors along a path whereby said tray back fingers pass between said platform fingers and said tray bases are transported long a path disposed below said platform.

2. An article handling apparatus comprising a first pair of transversely spaced parallel endless conveyors traversing a longitudinal run having a horizontal component and a connecting end run having a vertical component, means driving said conveyors in a direction along said end run and forwardly from said end run along said longitudinal run, a plurality of article supporting trays carried by and between said conveyors and including base members and back members defined by upwardly directed transversely spaced fingers, a stationary article supporting platform defined by a plurality of forwardly directed fingers extending from a point rearward of said end run and substantially along said longitudinal run, said platform fingers being staggered relative to said tray back member fingers and said platform being so disposed that said tray bases are transported below said platform and said back fingers extend between said platform fingers, an endless belt conveyor having a transverse substantially horizontal run extending along the rear of said platform, a pusher member, and means carrying said pusher member in a forward direction across the upper surface of said belt conveyor and said platform in synchronism with the movement of said tray supporting conveyors.

3. An apparatus in accordance with claim 2, wherein said pusher member carrying means includes an endless actuating conveyor extending longitudinally above said platform and said belt conveyor, said pusher member comprising an outwardly directed paddle carried by said actuating conveyor.

References Cited in the file of this patent

UNITED STATES PATENTS

| | | |
|---|---|---|
| 661,197 | Sydney | Nov. 6, 1900 |
| 683,039 | Hagen | Sept. 24, 1901 |
| 707,489 | Wright | Aug. 19, 1902 |
| 1,135,316 | Olson | Apr. 13, 1915 |
| 1,223,687 | Fritz | Apr. 24, 1917 |
| 2,260,686 | Segrin | Oct. 28, 1941 |
| 2,335,118 | Houser et al. | Nov. 23, 1943 |
| 2,381,502 | Lang | Aug. 7, 1945 |
| 2,583,847 | Hummel | Jan. 29, 1952 |

FOREIGN PATENTS

| | | |
|---|---|---|
| 85,540 | Sweden | Feb. 18, 1936 |